Patented June 9, 1942

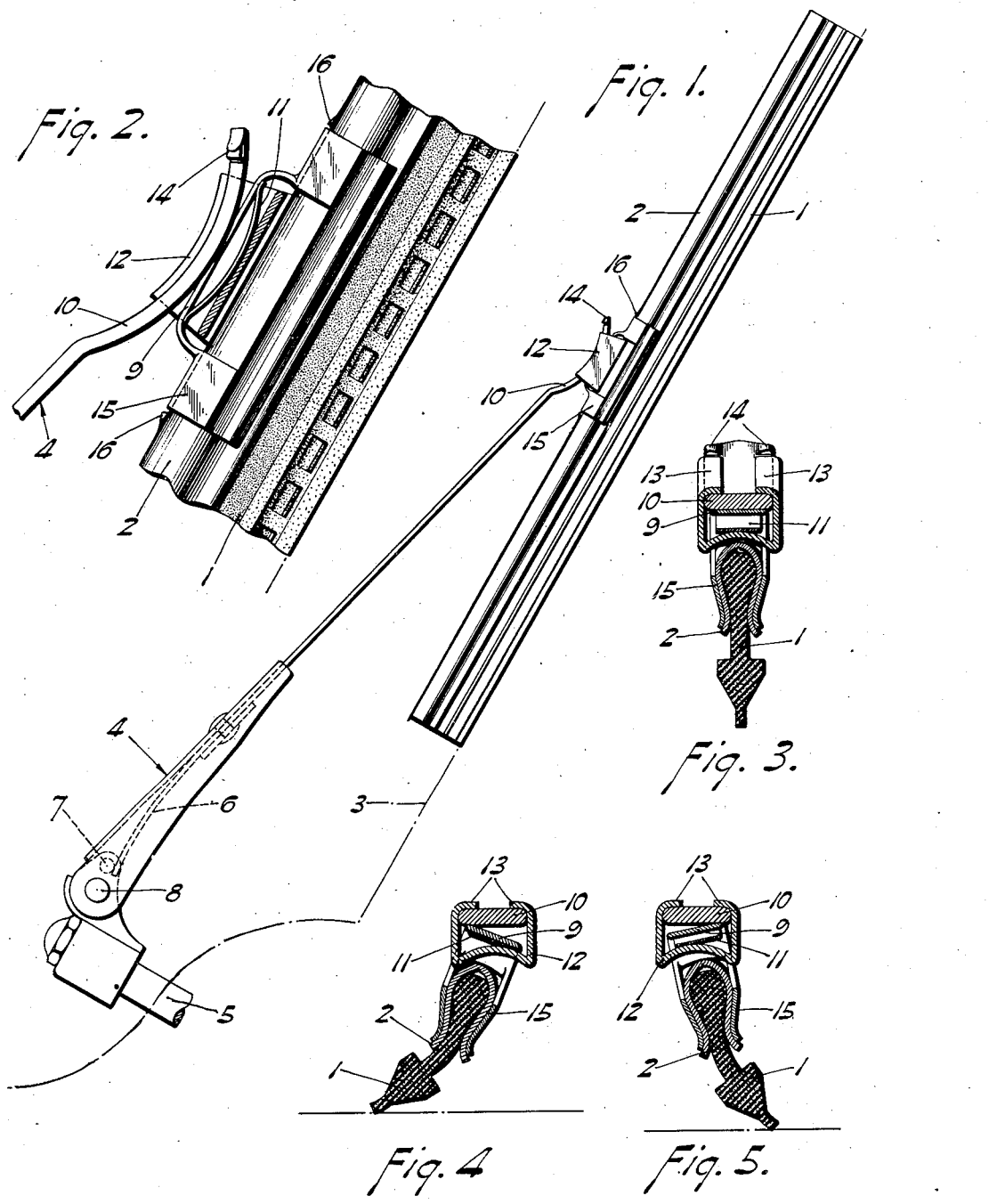

2,285,618

UNITED STATES PATENT OFFICE 2,285,618

WINDSHIELD WIPER MOUNTING

Anthony C. Scinta, Buffalo, N. Y., assignor to Trico Products Corporation, Buffalo, N. Y.

Application March 13, 1939, Serial No. 261,477

11 Claims. (Cl. 15—250)

This invention relates to windshield cleaners and more particularly to the mounting of the wiper or squeegee.

It has heretofore been proposed to introduce a normalizing action in the mounting of wipers by way of an interposed spring, the presence of which had among other disadvantages that of opposing the normal wiping operations of the wipers and thereby disarranging certain parts in the mounting attachment.

The present invention has for its primary aim to provide a practical wiper mounting in which the wiping pressure is transmitted from the arm to the wiper in such manner as to secure a better wiping performance. Further, the invention has for its object to provide an improved wiper mounting in which its actuating arm cooperates to produce an efficient action by which the period of usefulness of the wiper is materially prolonged.

In the drawing

Fig. 1 is a fragmentary view depicting in side elevation a windshield cleaner operatively disposed and incorporating the present invention;

Fig. 2 is an enlarged view more clearly showing the wiper mounting construction in longitudinal section;

Fig. 3 is a transverse section therethrough; and

Figs. 4 and 5 are similar views illustrating the cooperative relationship between the arm and wiper parts.

Referring more particularly to the drawing, the numeral 1 designates the wiping blade or squeegee with its channeled backing 2, and 3 the windshield surface over which the wiper is oscillated by the arm 4 in turn fixed to the actuating shaft 5. The wiper is urged against the windshield under the required wiping pressure by a leaf spring 6 which reacts upon a fixed pin 7 to urge the outer end of the arm clockwise about the pivot 8 as viewed in Fig. 1 and all in a manner more fully set forth in Patent No. 2,260,903, granted October 28, 1941, to Erwin C. Horton.

The wiper is provided on its back with a bearing surface 9 affording laterally spaced shoulders on which the outer end 10 of the arm presses and about which the wiper may pivot as the latter rocks to a dragging position at the start of each stroke. The under face of the outer end 10 as well as the bearing surface 9 are transversely flat or so formed as to mutually cooperate in producing an urge or tendency to restore and hold the wiper normal to the windshield surface when the wiper is at rest. These parts are, however, connected to provide for the desired rocking of the wiper during operation. This normalizing urge or tendency is augmented by the provision of resilient means, such as a leaf spring 11, which exerts its force upon both parts against separation. For this purpose the spring 11 is placed beneath the bearing 9 and held up thereagainst by a stirrup 12 carried by the arm. The spring being compressed between the bearing and its underlying stirrup will normally urge the bearing into full flat engagement with the arm but yield under further compression as the wiper rocks on the flat under face of the arm. The normalizing spring 11 will neither become disarranged nor will it serve to transmit pressure to the wiping contact as provided by the spring arm 6. The spring 11 will always be in a position urging the two faces 9 and 10 toward full engagement. This is especially important in that the wiping edge always rocks about definite points on the arm and is never in an unstable or floating condition with respect to the carrying arm.

In this connection it will be observed that the width of the bearing surface 9 is less than the width of the arm terminal 10 so that its side edges may rock thereon, as shown in Figs. 4 and 5. Furthermore, during this rocking action it will be observed that the stirrup is floatingly supported off the bearing 9 out of contact therewith. The base of the stirrup may be convexed to facilitate the rocking of the normalizing spring thereon, and this convexity being pressed in will in turn provide a concave recess at the underside of the stirrup to afford proper clearance for the wiper movement. The stirrup is preferably formed detachable from the arm but rigid therewith and for this purpose the legs of the stirrup are turned inwardly to form flanges 13 for overlying the arm. The arm terminal portion together with its seat, as formed by these flanges, may be curved lengthwise of the arm for nesting engagement and held against accidental disengagement by retaining lugs 14 struck from the arm. By reason of this imparted curvature the ends of the seat are spaced from the bearing surface to facilitate the introduction of the arm terminal. To disengage the blade from its arm the outer end of the former is lifted relative to the arm which causes the inner ends of the flanges 13 to fulcrum on the curved terminal 10 subsequent to a preliminary tilting of the stirrup forwardly against the backing 2 on which it pivots outwardly to a limited extent during this movement. This cants the stirrup on its floating mounting and displaces the outer ends of the flanges from the plane of the retaining lugs 14 so that the flanges may be slid off the arm.

The bearing 9 may be formed separate from the backing 2 by forming it a part of a clip 15 of U-shaped design having resilient legs adapted to be sprung over the back of the blade or slid over an end thereof to a position between a pair of nibs 16 pressed out of the backing 2. These nibs, while serving to interlock the clip to the blade, will obviously permit the clip yielding thereover when forced along the backing to the operative position. In the illustrated embodiment the bearing 9 is offset from the backing to provide a pocket for receiving the normalizing spring 11 and the blade carried stirrup. Preferably both ends of the bearing surface are supported by the clip body providing in effect a bridge formation on which the arm exerts its wiping pressure for being transmitted thereby directly to the wiping edge.

In operation, and referring particularly to Fig. 4 wherein the arm and wiper are depicted in the relation assumed when moving to the right, the bearing bridge 9 is fulcruming on its left or upper edge and has fully compressed the normalizing spring down against the stirrup which latter is rigid with the arm and may or may not contact the backing 2, the effective extent of rocking movement being determined by the spring confining stirrup. In Fig. 5 the relation of parts is short of the extreme rocking limit relation to depict more clearly the rocking of the bearing bridge on the undersurface of the arm.

By this construction and arrangement the spring pressure for the wiping contact is derived from the arm spring 6 and is transmitted directly to the wiping blade and not through the normalizing spring, the latter functioning solely to restore or urge the blade to an upright position as shown in Fig. 3. The function of the stirrup is to support the normalizing spring and also afford a positive driving connection between the blade and arm since the normalizing tendency is produced by the mutual cooperation between the bearing surface and the undersurface of the arm. For this reason the legs of the stirrup firmly embrace the arm so that the latter does not wobble or play within the stirrup.

It will be understood that the construction herein described and shown is merely illustrative of the inventive principles involved, which may be applied to other physical embodiments without departing from the scope and spirit of the invention claimed.

I claim:

1. In a windshield cleaner, a wiping blade having a relatively fixed transverse bearing across its back, an actuating arm having a transverse part with an under face on which the transverse bearing directly and rockably engages and by which the blade is urged into wiping contact with the windshield, said blade bearing and said under face of the arm part having laterally spaced portions fully interengaging when the blade is normal to the windshield and alternately engaging in a rocking manner at the beginning of each stroke for permitting the blade to assume a dragging position when wiping, and means resiliently acting between parts on the arm and blade for urging said portions of the blade bearing into full engagement with said portions of the under face of the arm part, said resilient means yielding while permitting rocking of the blade on such under face to the dragging position for wiping, the resilient means being so arranged as to remain unaffected by any variation in the arm pressure on the blade.

2. A windshield cleaner comprising a wiping blade having a relatively fixed transverse rigid bearing, an actuating arm having a terminal part with a transverse under face on which latter said blade bearing directly and rockably engages whereby the arm pressure is transmitted directly to the wiping blade and the latter is rockably supported on such transverse under face of the arm, means loosely confining the blade bearing to such under face while permitting the blade to rock on the latter, and resilient means acting between parts on the arm and blade for holding said blade bearing constantly engaged with such under face and also yieldably acting to restore the bearing into full facial contact with the under face after rocking action, the resilient means being so arranged as to remain unaffected by any variation in the arm pressure on the blade.

3. In a windshield cleaner, a wiper having a relatively fixed arm attaching part provided with a transverse bearing, an actuating arm having a spring pressed part with an under face on which the wiper bearing directly and rockably engages for urging the wiping edge of the wiper onto the surface being wiped, said wiper bearing being of less width than and free to rock on the under face of the arm in either direction sidewise from a neutral position normal with the surface to enable the wiper assuming a rearwardly inclined position when wiping, a member detachably coupling the wiper to the arm, said member having a part beneath the bearing, and means resiliently acting between said member part and a part on the wiper for holding said wiper bearing fully engaged with the under face of the arm part while permitting the wiper to rock on its wiping edge, whereby after rocking the wiper will be urged to its neutral position while maintaining the direct engagement between the arm and wiper.

4. In a windshield cleaner, a wiper having a substantially flat arm bearing spaced at its intermediate portion from the wiper body to define therewith a pocket, an actuating arm having a transversely flat under face resiliently pressing down on the arm bearing to urge the wiper against the windshield, a resilient member arranged in the pocket, and stirrup means carried by the arm and extending down beyond the arm bearing to support the resilient member up against the underside of the arm bearing.

5. A wiper for attachment to an arm having a generally flat face in a transverse direction having a transverse generally flat arm bearing spaced from the wiper body to provide an underlying pocket, a stirrup engaged in the underlying pocket and extending above the arm bearing for attachment to the arm to hold its face on the bearing for relative rocking movement, and a spring arranged in the underlying pocket and supported by the stirrup under compression against the underside of the arm bearing to resiliently urge the bearing in full engagement with an associated arm face.

6. In a windshield cleaner, a wiper having a substantially flat arm bearing part with an underlying pocket, a stirrup engaged in the pocket and having upstanding legs straddling the arm bearing and turned inwardly to provide parts adapted to engage an arm and hold it rockably related to the bearing, and spring means in the pocket between the stirrup and the arm bearing for resiliently urging said parts down on to the arm bearing.

7. In a windshield cleaner, a wiper having a transverse substantially flat arm bearing and an underlying pocket, a rockable stirrup engaged in the pocket and having upstanding legs straddling the arm bearing and turned inwardly thereover to provide arm engaging parts overlying the same, and spring means interposed between the stirrup and the underside of the arm bearing for resiliently urging said parts down on to the arm bearing, said stirrup being movable against the spring means to space said arm engaging parts from the bearing to facilitate the introduction of an arm therebeneath.

8. In a windshield cleaner, a wiper having a transverse substantially flat bearing and an underlying pocket, an actuating arm having a terminal with a transverse generally flat face seating on the wiper bearing, a stirrup loosely engaged in the underlying pocket and having suspending legs straddling the wiper bearing and detachably embracing the arm terminal, the latter protruding at its free end from the stirrup and carrying a retaining part acting to hold said stirrup against unauthorized displacement, and resilient means held by the stirrup under compression against the underside of the wiper bearing to urge the latter in resilient engagement with the arm face.

9. In a windshield cleaner, a wiper having a relatively rigid arm attaching part provided with a transversely flat bearing, an actuating arm having a transversely flat face cooperatively engaging the flat bearing for relative rocking movement and to normalize the wiper with respect to the windshield, and means yieldably holding said arm and bearing cooperatively engaged, the flat face of the arm being of greater width than the flat bearing whereby the oppostie edges of the latter may rock on said flat face against the yielding of said holding means.

10. In a windshield cleaner, a wiper having a relatively fixed bearing on its back, an actuating arm having a spring urged bearing part superimposed directly upon the wiper bearing whereby the spring pressure of the arm is transmitted directly to the wiper for providing the desired pressure in the contact of the wiping edge with the surface being cleaned, the fixed bearing of the wiper directly and rockably engaging the under surface of the spring urged bearing part of the arm, means rockably confining such direct engagement of the wiper bearing on the arm bearing to permit the former rocking on the latter in a manner to rearwardly incline the wiper when being operated, and wiper normalizing means resiliently acting between parts on the wiper and arm for holding the wiper bearing in direct engagement with the arm bearing part and acting to restore the wiper to a position of rest normal to the cleaned surface whereby the spring pressure from the arm part will be transmitted directly to the wiping edge independently of the normalizing means, the normalizing means being so arranged as to remain unaffected by any variation in the arm pressure on the blade.

11. In a windshield cleaner, a wiper having a transverse substantially flat bearing and an underlying pocket, an actuating arm having a terminal with a transverse generally flat face seating on the wiper bearing, parts carried by the arm terminal and freely straddling the wiper bearing to permit the wiper rocking on the under surface of the arm bearing, and resilient means held by the straddling parts under compression against the underside of the wiper bearing to urge the latter in resilient engagement with the arm face.

ANTHONY C. SCINTA.